Feb. 24, 1959   S. M. BRASSINGTON ET AL   2,875,342
SYNCHRONOUS CHOPPER FOR RADIANT ENERGY
Filed Feb. 23, 1954

Inventors: S. M. Brassington
V. N. Smith
By:
Their Attorney

United States Patent Office 2,875,342
Patented Feb. 24, 1959

2,875,342

SYNCHRONOUS CHOPPER FOR RADIANT ENERGY

Samuel M. Brassington, Oakland, and Vigo N. Smith, San Leandro, Calif., assignors to Shell Development Company, Emeryville, Calif., a corporation of Delaware Application February 23, 1954, Serial No. 411,678

2 Claims. (Cl. 250—233)

This invention pertains to measurements involving the use of radiation, and relates more particularly to a chopper or interrupter for radiant energy provided with built-in electrical motor elements which enable said chopper to rotate at a predetermined fixed speed in synchronism with the current alternations of a supply source or feed line without requiring the help of extraneous motor means.

Many measurement and analysis systems involve the use of radiant energy in forms such as X-rays, infra-red and ultra-violet rays, ultrasonic wave rays, and the like. Quite often, it becomes necessary or desirable to chop or periodically interrupt these rays to increase the sensitivity of the system, as interrupted radiant energy is readily translatable into alternating current and is thus well adapted to high degree amplification.

Radiation choppers are commonly built in the form of a perforated disk rotating at a constant speed, said disk being interposed between a source of radiation and a radiation-sensitive element. Rotation is imparted to the choppers by means of constant speed motors mounted coaxially therewith. That is, the chopper is either mounted directly on the shaft of the motor, or the shaft of the motor is directly coupled to the shaft of the chopper. Motor and chopper arrangements other than co-axial are not favored, since they normally involve the use of transmission means such as gears, chains or belts, and the resultant back-lash or slippage tends to affect the accuracy of the system.

The axially-coupled chopper motor has however several drawbacks. First, it increases further the overall length of a radiation-analysis system which is already considerable, since the light source and the elongated filter, absorption and detector cells are all commonly arranged in the direction of the same axis. Second, heat is developed by the motor in the region of the motor-chopper shaft. Since only restricted space is usually available within radiation-analysis cabinet, this heat is likely to have, unless forced ventilation is used, an unfavorable effect on bearings and on the shutter itself, which may become a secondary source of radiation. Third, the axial arrangement of the motor makes access to the heart of the system very difficult, any replacement of the cells, shutter, etc. requiring a complete dismounting of the whole apparatus.

It is therefore an object of this invention to provide a self-actuating chopper for use in systems involving the use of radiant energy.

It is also an object of this invention to provide for said purpose a circular chopper carrying built-in motor armature elements capable of rotating by reaction with stationary motor field elements arranged circumferentially of said chopper.

It is also an object of this invention to provide for the object stated a chopper comprising a perforated disk capable of rotating as the armature of a hysteresis-type synchronous motor having a stationary winding arranged over a relatively small arc of the periphery of said disk.

These and other objects of this invention will be understood from the following description taken with reference to the attached drawings, wherein.

Figure 1A:
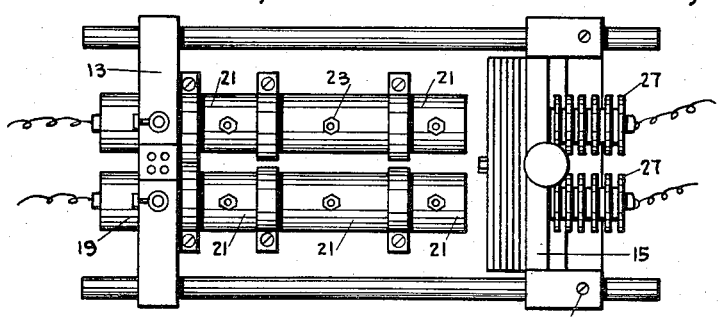
Figs. 1a and 1b are diagrammatic plan and elevation views, respectively, of a radiant energy measurement or analysis system embodying the shutter-motor combination of the present invention.
Figure 1B:
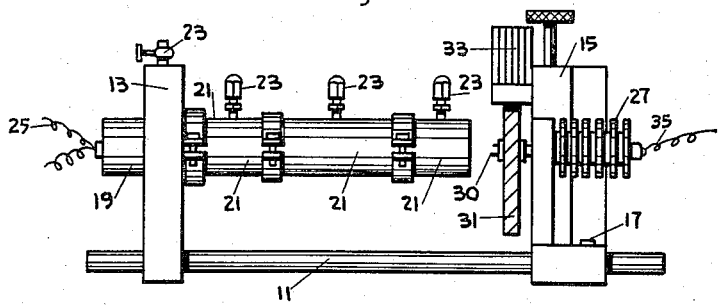

Referring to the drawings, Figs. 1a and 1b, illustrate the present invention with regard to an analysis and measurement system involving the use of infra-red radiant energy. The system of Figs. 1a and 1b, which is normally mounted within an enclosed cabinet, not shown, may comprise a frame member such as a bar or bars 11 supporting bracket members 13 and 15 which are slidable thereon and may be fixedly clamped thereto by means of screws 17 at a desired distance from each other.

Bracket 13 supports a detector cell 19, and any desired combination or number of sample, absorption and filter cells, and the like indicated at 21 and disposed in axial alignment with the detector cell. Normally, two identical detector cells 19 (and two sets of cylindrical sample, absorption, filter, etc. cells) are used in parallel, as clearly shown in Fig. 1a. Means or connections for supplying desired fluids to the cells are shown at 23, and means for electrically energizing the detector cell 19 and for carrying signals therefrom to suitable indicating or recording apparatus are diagrammatically indicated at 25.

The bracket 15 supports a light source, such as a single filament cell or cells 27, arranged in axial or optical alignment with the cells 19 and 21. Interposed between the light source and the cells 19 and 21 and rotatably supported by bracket 15 on a shaft 30 is the chopper or rotor disk 31 of the present invention. A field structure 33 which reacts therewith to rotate said chopper, is likewise fixedly attached to the bracket 15 and is energized through leads indicated at 35.

Figure 2A:
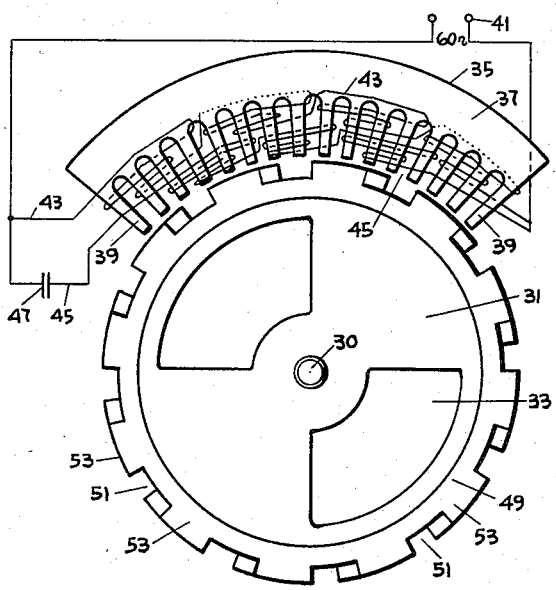
Figs. 2a and 2b are front and side elevation views, respectively, of the present shutter, comprising a wiring diagram of the field coils therefor.
Figure 2B:
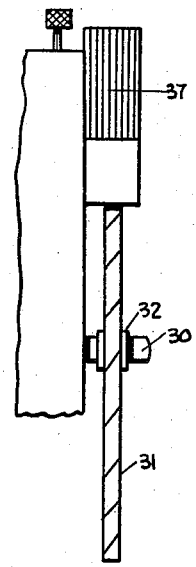

The field structure 33, shown in greater detail in Figs. 2a and 2b, comprises a laminated arcuate yoke 37 having a number of teeth 39 forming the cores of a desired number of poles when provided with a suitable winding. The coils wound on the teeth 39 may be formed in any desired manner to give a rotating field when energized with alternating current, and may comprise a three, two or single phase winding. Fig. 2a illustrates a pole structure provided with a single phase winding. A suitable source, such as the terminals 41 of a commercial 60 cycle power supply are used to energize a first winding 43 which is lap-wound around the teeth of the arcuate yoke 37 to form 4 poles as shown in Fig. 2a. A second winding 45 is connected to the same terminals 41 in parallel with the winding 43 and in series with a condenser 47 of suitable capacity to produce a substantially 90° phase shift between the windings 43 and 45, the resistances of these two windings having usually different values. Fig. 2a shows winding 45 arranged so as to form 3 lap-wound poles which are interposed between the 4 poles of winding 43 in such a manner that a rotating field is obtained when alternating current is passed from terminals 41 through the windings 43 and 45.

The arcuate field pole structure may extend through any desired arc but preferably an arc not greater than 120 degrees to facilitate access to the inner parts of the system. In the structure shown in Fig. 2a, the windings are designed to provide poles electrically spaced from each other so as to correspond to the structure of a 360 degree, twelve-pole motor field.

The rotor-shutter 31 is mounted for rotation within the arcuate segment of the field structure, and may have any desired diameter, such for example as from 3 to 6 inches, said diameter being slightly smaller than that of the circle containing the pole faces of the field structure.

The shutter 31 is preferably made in the form of a flat wheel, having a thickness such as a quarter of an inch, and is carried by the shaft 30 on a ball bearing assembly 32 recessed into the rotor 31 on each side thereof at the center. The rotor 31 is provided with one or more windows 33 which cause it to serve as a shutter or cyclic interrupter when rotating in the path of a beam of radiant energy. The rotor 31 is made of a non-magnetic metal, such for example as bronze, magnesium, aluminum, etc. or an alloy thereof. Shrunk or otherwise affixed to the periphery of the rotor 31 is a rim 49 made of a high hysteresis magnetic material, such for example as carburized steel.

The rim 49 is relieved on its outer circumference by a number of diagonal recesses 51, whereby an equal number of teeth or poles 53 is formed therebetween. Twelve teeth and twelve recesses are used in the structure of Fig. 2a to correspond to the theoretical twelve-pole structure of the field coils, the arcuate length of the recesses being slightly less than that of the teeth. The recesses 51 are cut diagonally or at an angle to the flat side surfaces of the wheel 31 to obtain a more favorable distribution of the magnetic flux in the teeth 53.

The present shutter operates on the well-known principle of the hysteresis motor. After energizing the detector cell 19 and the light source 27, and admitting the desired fluids or fluid mixtures to the absorption and sample cells, the field windings 43 and 45 are energized substantially in quadrature with each other from the A. C. terminals 41, thus creating a field which rotates, for the example of Fig. 2a, at 600 R. P. M. This field induces in the toothed rim 49 a corresponding number of armature poles, and the rotor-shutter 31 rotates in a manner predetermined by the reaction between the field and the armature. Due to the high retentivity of the material of the rim 49, the teeth 53 thereof, once magnetized to a particular polarity, tend to retain said polarity, and the armature thus locks in step with the rotating field, rotating at a speed synchronized therewith, in a manner well-known from the theory of hysteresis motor operation.

It is understood that the rim of the rotor may be smooth if the magnetic (hysteresis) properties of the iron forming the rim are very good so that definite poles are readily formed. In such cases, it is preferable to have a field structure completely surrounding the rotor. When using a material such as carburized hot rolled steel to form the rotor, it is usually necessary to cut teeth or otherwise structurally define poles on the rim thereof to concentrate the magnetic flux at desired intervals along the rim, thereby insuring the formation of the proper number of poles. The pole-defining teeth are particularly necessary when using a field sector of less than 360 degrees, because of end effects and power reduction occurring in such cases. As stated above, an arcuate field extending through a sector of no more than 120 degrees is particularly desirable because of saving in space and improved accessibility of parts.

Diagonally cut teeth are preferable to teeth cut across the rim at right angles, as the particular flux distribution obtained in such case improves the transition of the field from one pole of the rotor to the next one during the starting operation when the rotor is slipping with regard to the rotating field, which results in an increased starting torque. This is highly desirable to insure that synchronous speed is reached, even though the running torque at synchronous speed may be slightly decreased by the use of diagonally cut teeth. An added advantage of the latter lies in the increased effective damping provided because of the decreased rate of change of torque with change of phase angle between the rotor and the rotating field. This results in more constant speed and in a virtual elimination of small oscillations at about the value of the synchronous speed.

We claim as our invention:

1. For measurements involving the use of interrupted radiant energy, a radiation chopper comprising an apertured opaque rotor disk having its central portion made of non-magnetic material and its outer rim portion made of high hysteresis magnetic material, an arcuate pole core structure having its inner circumference concentrically adjacent the outer rim of said rotor disk throughout an angle of not more than 120 degrees, the outer rim portion of said disk having a plurality of recesses formed therein to define a plurality of pole pieces, each pole piece having parallel radial sides, said radial sides in addition being formed in planes inclined at an angle to the axis of said rotor disk, and winding means on said pole structure adapted to produce a rotating magnetic field, said means comprising two windings carrying alternating currents in quadrature with each other.

2. For measurements involving the use of interrupted radiant energy, a radiation chopper comprising an apertured opaque rotor disk having its central portion made of non-magnetic material and its outer rim portion made of carburized steel, an arcuate pole core structure having its inner circumference concentrically adjacent the outer rim of said rotor disk throughout an angle of not more than 120 degrees, the outer rim portion of said disk having a plurality of recesses formed therein to define a plurality of pole pieces, each pole piece having parallel radial sides, said radial sides in addition being formed in planes inclined at an angle to the axis of said rotor disk, and winding means on said pole structure adapted to produce a rotating magnetic field, said means comprising two windings carrying alternating currents in quadrature with each other.

References Cited in the file of this patent

UNITED STATES PATENTS

| | | |
|---|---|---|
| 688,458 | Caldwell | Dec. 10, 1901 |
| 1,396,651 | Moore | Nov. 8, 1921 |
| 1,416,306 | Sandell | May 16, 1922 |
| 1,419,749 | Murphy | June 13, 1922 |
| 1,551,347 | Trombetta | Aug. 25, 1925 |
| 1,851,586 | Knobel | Mar. 29, 1932 |
| 2,128,719 | Thompson | Aug. 30, 1938 |
| 2,555,327 | Elliott | June 5, 1951 |